(12) United States Patent
Murakami (10) Patent No.: US 7,349,718 B2
(45) Date of Patent: Mar. 25, 2008

(54) PORTABLE TELEPHONE SET

(75) Inventor: Takashi Murakami, Saitama (JP)

(73) Assignee: NEC Corporation, Tokyo (JP)

( * ) Notice: Subject to any disclaimer, the term of this patent is extended or adjusted under 35 U.S.C. 154(b) by 579 days.

(21) Appl. No.: 10/051,073

(22) Filed: Jan. 22, 2002

(65) Prior Publication Data
US 2002/0098810 A1    Jul. 25, 2002

(30) Foreign Application Priority Data
Jan. 23, 2001    (JP) .............................. 2001-014480

(51) Int. Cl.
*H04B 17/00* (2006.01)
*H04M 1/00* (2006.01)
(52) U.S. Cl. ................ 455/553.1; 455/67.11; 455/88; 455/575.1
(58) Field of Classification Search ............ 455/67.11, 455/67.15, 69.81, 88, 553.1, 559, 560, 572, 455/575.1
See application file for complete search history.

(56) References Cited

U.S. PATENT DOCUMENTS

| 5,799,245 A | * | 8/1998 | Ohashi | .................. | 455/69 |
| 6,243,563 B1 | * | 6/2001 | Nakamura | ................ | 455/78 |

FOREIGN PATENT DOCUMENTS

| JP | 62-147937 | 9/1987 |
| JP | 7-50625 | 2/1995 |
| JP | 9-46110 | 2/1997 |
| JP | 10-294686 | 11/1998 |

OTHER PUBLICATIONS

English translation of JP 409046110.*
Japanese Office Action dated Jun. 25, 2003, with partial English translation.
Japanese Office Action dated Mar. 19, 2003, with partial English translation.

* cited by examiner

*Primary Examiner*—Yuwen Pan
(74) *Attorney, Agent, or Firm*—McGinn IP Law Group, PLLC

(57) ABSTRACT

A first housing 14 is provided with a first and a second terminals 11a, 11b to be connected with a first and a second external antennas. A second housing 13 is connected via a coaxial cable 9 with the first housing 14. The first housing 14 includes a switch 10 connected via a capacitor 3b with the coaxial cable, for selectively connecting one of the first and second terminals 11a, 11b which provides higher receipt sensitivity on the basis of a switching signal and a DC power supply 12 connected via an inductance 4b to the coaxial cable 9. The second housing 13 includes a radio circuit 2 connected via the capacitance 3a with the coaxial cable 9, for processing a radio signal to be transmitted, supplying the processed radio signals to the first or second internal antenna 7 or 8 and processing the received radio signal. A control circuit 1 is connected via the inductance 4a to the coaxial cable 9 for outputting the switching signal on the basis of the received signal level by the external antenna and an inductance connected between the coaxial cable and a circuit required to be supplied with the DC power supply. Thus the radio signal is transmitted/received and the DC power is supplied via the coaxial cable 9.

9 Claims, 6 Drawing Sheets

PORTABLE TELEPHONE SET

BACKGROUND OF THE PRESENT INVENTION

This application claims benefit of Japanese Patent Application No. 2001-014480 on Jan. 23, 2001, the contents of which are incorporated by the reference.

The present invention relates to portable telephone sets and, more particularly, to foldable portable telephone sets having two foldable housings interconnected by a cable.

In a prior art telephone set such as a foldable portable telephone set, when the set is in use for communication, radio signals are received by an exclusive receiving antenna and a transmitting/receiving antenna and transmitted via a cable to a radio circuit in which the better sensitivity one of the radio signals is demodulated.

Figure 6:
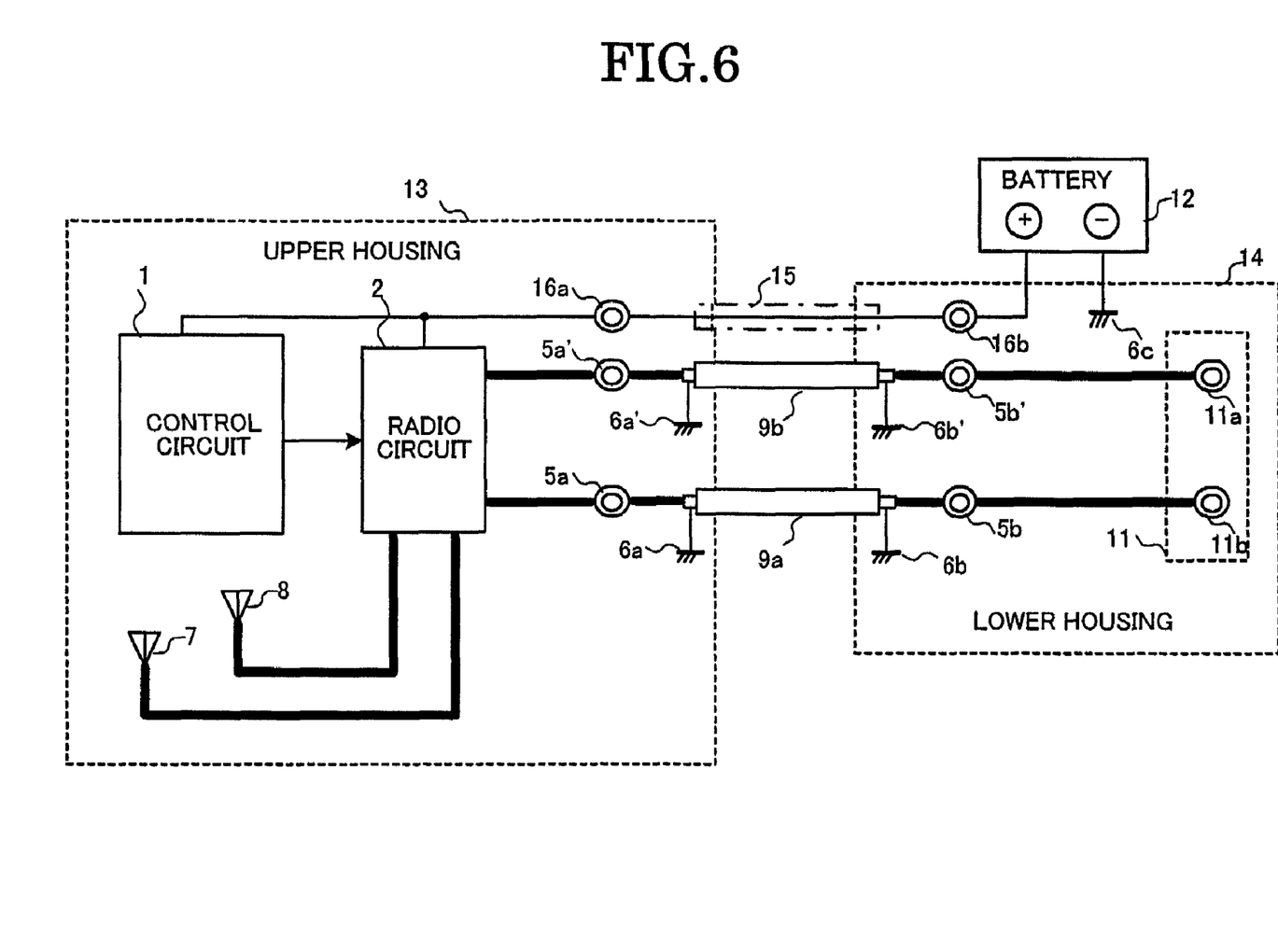
FIG. 6 is a block diagram schematically showing a prior art foldable telephone set.

FIG. 6 is a block diagram schematically showing a prior art foldable telephone set. Referring to the Figure, reference numeral 13 designates an upper housing, and reference numeral 14 designates a lower housing. These housings 13 and 14 are interconnected by coaxial cables 9a and 9b and a flexible circuit board 15. The coaxial cables 9a and 9b serve such that when an external antenna assembly such as a vehicle antenna assembly is connected to an external input/output terminal unit 11, radio signals received by the external antenna assembly are transmitted therethrough to the side of the upper housing 13. The flexible circuit board 15 supplies the power from a battery 12 to the side of the upper housing 13.

The upper housing 13 accommodates a radio circuit 2 for demodulating the radio signal to obtain a voice signal or the like and modulating voice signal or the like to to obtain the radio signal, a radio signal transmitting/receiving antenna 7, an exclusive radio signal receiving antenna 8, a control circuit 1 for controlling the timings of transmission and reception of radio signals and so forth, RF (radio frequency) connectors 5a and 5a' interconnecting the coaxial cables 9a and 9b and the lower housing 14, GND (ground) terminals 6a and 6a' provided between the RF connectors 5a and 5a' and the coaxial cables 9a and 9b, and a flexible circuit board connector 16b interconnecting the flexible circuit board 15 and the lower housing 14.

The radio circuit 2 has an amplifier for amplifying the radio signals and an isolator for such purposes as preventing mixed modulation and the oscillation frequency stabilization.

The lower housing 14 accommodates a transmitting/receiving RF terminal 11a for inputting and outputting the radio signals from and to a transmitting/receiving antenna in an external antenna assembly connected via the external input/output terminal unit 11, an exclusive receiving RF terminal 11b for inputting radio signals from an exclusive receiving antenna in the external antenna assembly, RF connectors 5b and 5b' interconnecting the coaxial cables 9a and 9b and the upper housing 13, a GND terminal 6c connected to the minus terminal of the battery 12, and GND terminals 6b and 6b' provided between the RF connectors 5a and 5b' and the coaxial cables 9a and 9b.

The operation of the telephone set in the case of radio signal communication with the external antenna assembly connected to the external input/output terminal unit 11, will now be described. In this state, the operations of antennas 7 and 8 are effectively stopped.

A voice signal or the like is first passed for noise removal through a filter or the like and is then fed to the radio circuit 2. The radio circuit 2 modulates the inputted voice signal or the like to obtain a radio signal, and feeds out the radio signal at a timing instructed by the control circuit 1 via the RF connector 5a' and the coaxial cable 9b to the side of the lower housing 14. On the side of the lower housing 14, the radio signal fed through the coaxial cable 9b is taken via the RF connector 5b' to the inside. This radio signal is fed out via the transmitting/receiving RF terminal 11a to the external antenna assembly. The radio signal fed out to the external antenna assembly is radiated from the transmitting/receiving antenna therein to an opposite side telephone set or the like in the communication.

The radio signal radiated from the opposite side telephone set or the like is received by the transmitting/receiving antenna and the exclusive receiving antennas (not shown) in the external antenna assembly. The received radio signals are transmitted via the RF connectors 5b and 5b' and coaxial cables 9a and 9b to the side of the upper housing 13. On the side of the upper housing 13, the transmitted radio signals are taken via the RF connectors 5a and 5a' to the inside and fed to the radio circuit 2. The radio circuit 2 detects the better receiving sensitivity one of the input radio signals, and demodulates the better receiving sensitivity radio signal to obtain a voice signal or the like.

When the power supply to the telephone set is turned on, the charge outputted from the plus terminal of the battery 12 is supplied via the flexible circuit board connector 16b, the flexible circuit board 15 which mainly transmits control signals and the flexible circuit board connector 16a to the side of the upper housing 13. On the side of the upper housing 13, the control circuit 1 and the radio circuit 2 are activated and driven by the supplied power.

In the prior art technique as described above, however, two coaxial cables and so forth are used for the radio signal transmission between the two housings, and the radio signal transmitted via one of the two coaxial cables is not actually used for communication, which is undesired from the standpoint of efficient radio signal transmission between the two housings. In addition, in view of the reduction of the size, thickness and weight as desired for recent foldable portable telephone sets or the like, it is desired to preclude any wasteful coaxial cable.

Furthermore, while in the prior art technique a flexible circuit board or the like is used for the power supply from the battery, the flexible circuit board is readily affected by externally generated noise. Therefore, it is preferable to use other means for the power supply purpose.

SUMMARY OF THE INVENTION

An object of the present invention, accordingly, is to provide a portable telephone set with reduced size, thickness and weight.

Another object of the present invention is to provide a foldable portable telephone set capable of efficient inter-housing transmission of radio signals and various other signals.

According to a first aspect of the present invention, there is provided a portable telephone set comprising a detector for detecting the better receiving sensitivity one of radio signals received by an exclusive receiving antenna for only receiving radio signals and a transmitting/receiving antenna for transmitting and receiving radio signals, a switch for selecting the radio signal determined in the detector to be the better receiving sensitivity one, and a radio circuit for demodulating the radio signal from the switch.

According to a second aspect of the present invention, there is provided a portable telephone set comprising a detector for detecting the better receiving sensitivity one of radio signals received by an exclusive receiving antenna for only receiving radio signals and a transmitting/receiving antenna for transmitting and receiving radio signals, a switch provided in a first housing for selecting the radio signal determined in the detector to be the better receiving sensitivity one, and a radio circuit provided in a second housing for demodulating the radio signal from the switch, the switch and the radio circuit being interconnected by a cable.

According to a third aspect of the present invention, there is provided a portable telephone set comprising a detector for detecting the better receiving sensitivity one of radio signals received by an exclusive receiving antenna for only receiving radio signals and a transmitting/receiving antenna for transmitting and receiving radio signals, a switch provided in a first housing for selecting the radio signal determined in the detector to be the better receiving sensitivity one, a radio circuit provided in a second housing for demodulating the radio signal from the switch, and a battery for supplying power to at least the radio circuit is provided on the side of the first housing, the switch and the radio circuit being interconnected by a cable and power from the battery being supplied via the cable to the radio circuit.

According to a fourth aspect of the present invention, there is provided a portable telephone set comprising a detector for detecting the better receiving sensitivity one of radio signals received by an exclusive receiving antenna for only receiving radio signals and a transmitting/receiving antenna for transmitting and receiving radio signals, a switch provided in a first housing for selecting the radio signal determined in the detector to be the better receiving sensitivity one, and a radio circuit provided in a second housing for demodulating the radio signal from the switch, the switch and the radio circuit being interconnected by a cable and the individual antennas being secured to or detachably mounted on the body of the set.

According to a fifth aspect of the present invention, there is provided a portable telephone set comprising a detector for detecting the better receiving sensitivity one of radio signals received by an exclusive receiving antenna for only receiving radio signals and a transmitting/receiving antenna for transmitting and receiving radio signals, a switch provided in a first housing for selecting the radio signal determined in the detector to be the better receiving sensitivity one, a radio circuit provided in a second housing for demodulating the radio signal from the switch, and a battery for supplying power to at least the radio circuit is provided on the side of the first housing, the switch and the radio circuit being interconnected by a cable, power from the battery being supplied via the cable to the radio circuit and the individual antennas being secured to or detachably mounted on the body of the set.

The radio circuit and the cable are connected in parallel via coils and capacitors, and power from the battery is supplied via the coil side to the radio circuit, and a radio signal received by either one of the antennas is transmitted via the capacitor side to the radio circuit. The cable is a coaxial cable.

According to a sixth aspect of the present invention, there is provided a portable telephone set comprising a radio circuit for demodulating a radio signal received by an antenna and transmitted via a cable, and a battery for supplying power to the radio circuit, wherein: the battery and the radio circuit are interconnected by the cable, and power from the battery is supplied via the cable to the radio circuit.

According to a seventh aspect of the present invention, there is provided a portable telephone set including a first housing provided with a first and a second terminals to be connected with a first and a second external antennas, and a second housing electrically connected via a coaxial cable and mechanically connected with the first housing, the first housing including a switch connected via a capacitor with the coaxial cable, for selectively connecting one of the first and second terminals which provides higher receipt sensitivity on the basis of a switching signal and a DC power supply connected via an inductance to the coaxial cable, the second housing including a radio circuit connected via the capacitance with the coaxial cable, for processing a radio signal to be transmitted, supplying the processed radio signals to the first or second internal antenna and processing the received radio signal, a control circuit connected via an inductance with the coaxial cable, for outputting the switching signal on the basis of the received signal level by the external antenna and an inductance connected between the coaxial cable and a circuit required to be supplied with the DC power supply, thus the radio signal being transmitted/received and the DC power being supplied via the coaxial cable.

According to an eighth aspect of the present invention, there is provided a portable telephone set including a first housing provided with a first and a second terminals to be connected with a first and a second external antennas, and a second housing electrically connected via a coaxial cable and mechanically connected with the first housing, the first housing including a switch connected via a capacitor with the coaxial cable, for selectively connecting one of the first and second terminals which provides higher receipt sensitivity on the basis of a switching signal, a DC power supply connected via a inductance to the coaxial cable, and a control circuit for outputting the switching signal on the basis of the received signal level by the external antenna, the second housing including a radio circuit connected via the capacitance with the coaxial cable, for processing a radio signal to be transmitted, supplying the processed radio signals to the first or second internal antenna and processing the received radio signal, and an inductance connected between the coaxial cable and a circuit required to be supplied with the DC power supply, thus the radio signal being transmitted/received and the DC power being supplied via the coaxial cable.

According to a ninth aspect of the present invention, there is provided a portable telephone set including a first housing provided with a first and a second terminals to be connected with a first and a second external antennas, and a second housing electrically connected via a coaxial cable and mechanically connected with the first housing, the first housing including a radio circuit connected with the coaxial cable for processing a radio signal to be transmitted and supplies the processed radio signals to the first or second internal antenna and processing the received radio signal, a control circuit for outputting a switching signal on the basis of the received signal level by the external antenna, and a DC power supply for supplying DC power to the radio circuit, the second housing including a switch connected with the coaxial cable, for selectively connecting one of the first and second internal antennas which provides higher receipt sensitivity, thus the radio signal being transmitted/received via the coaxial cable.

According to a tenth aspect of the present invention, there is provided a portable telephone set including a first housing provided with a first and a second terminals to be connected with a first and a second external antennas, and a second housing electrically connected via a coaxial cable and mechanically connected with the first housing, the first housing including a radio circuit connected via a capacitance with the coaxial cable for processing a radio signal to be transmitted and a radio signal received by the external antenna, and a DC power supply connected via an inductance with the coaxial cable, the second housing including a switch connected via a capacitor, for selectively connecting one of the first and second internal antennas according to a switch signal, and a control circuit connected via an inductance with the coaxial cable, for outputting the switching signal on the basis of the received signal level via the coaxial cable, thus the radio signal being transmitted/received and the DC power being supplied via the coaxial cable.

The operations of internal antennas are stopped when the external antennas are connected to the first and second terminals.

Other objects and features will be clarified from the following description with reference to attached drawings.

PREFERRED EMBODIMENTS OF THE INVENTION

Preferred embodiments of the present invention will now be described with reference to the drawings.

Figure 1:
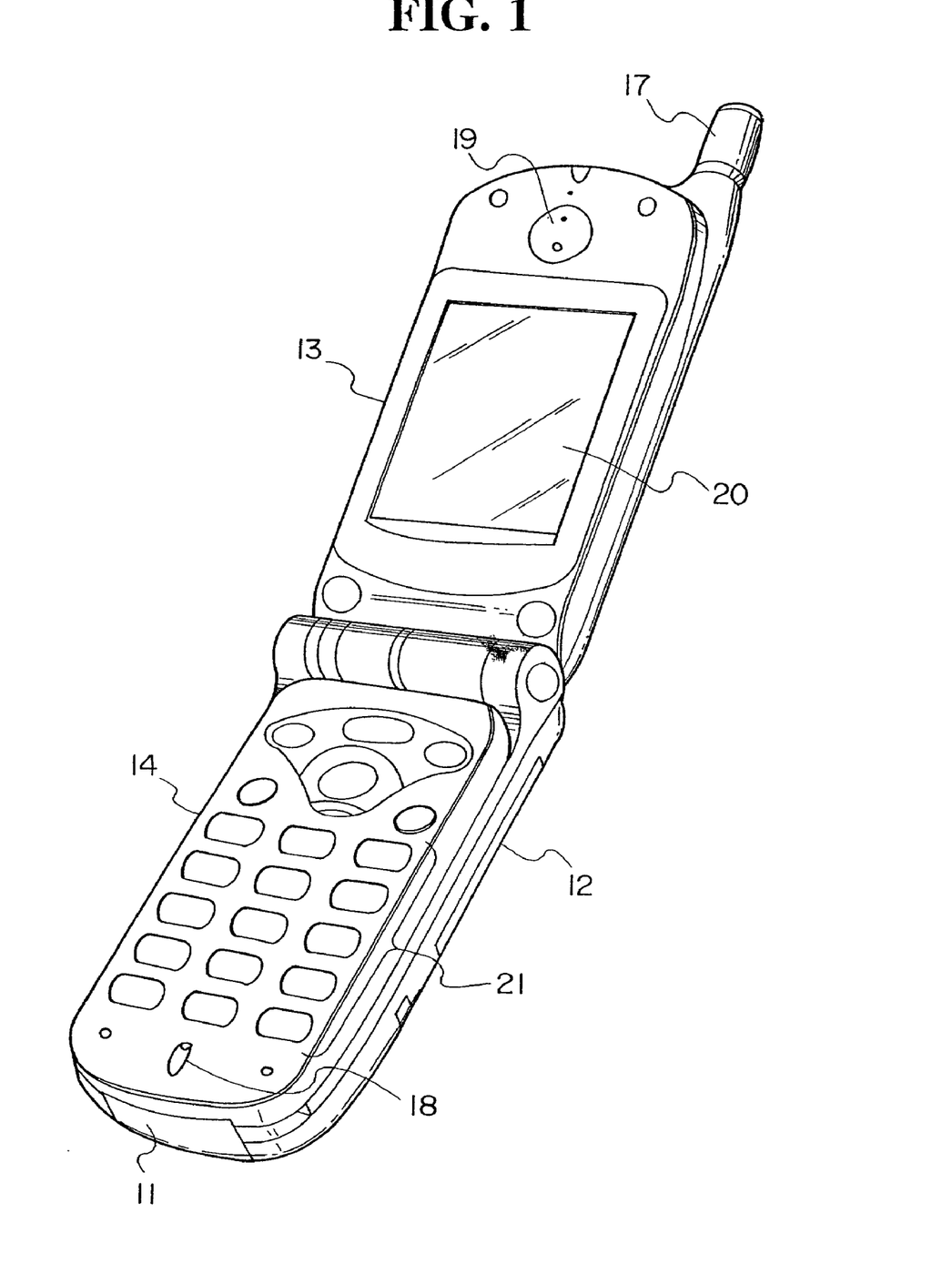
FIG. 1 is a perspective view showing a foldable portable telephone set as a first embodiment of the present invention.

FIG. 1 is a perspective view showing a foldable portable telephone set as a first embodiment of the present invention. The illustrated foldable portable telephone set comprises an antenna assembly 17 for transmitting and receiving radio signals in communication, an upper housing 13 including a display 20 for displaying various data and a loudspeaker 19 for outputting the voice signal, a lower housing 14 including an input button key set 21 for inputting various instructions, a microphone 18 for inputting the voice, an external input/output terminal unit 11 for connection to an external antenna assembly, a tester, etc., and a battery 12 for supplying the power to the body of the foldable portable telephone set.

Figure 2:
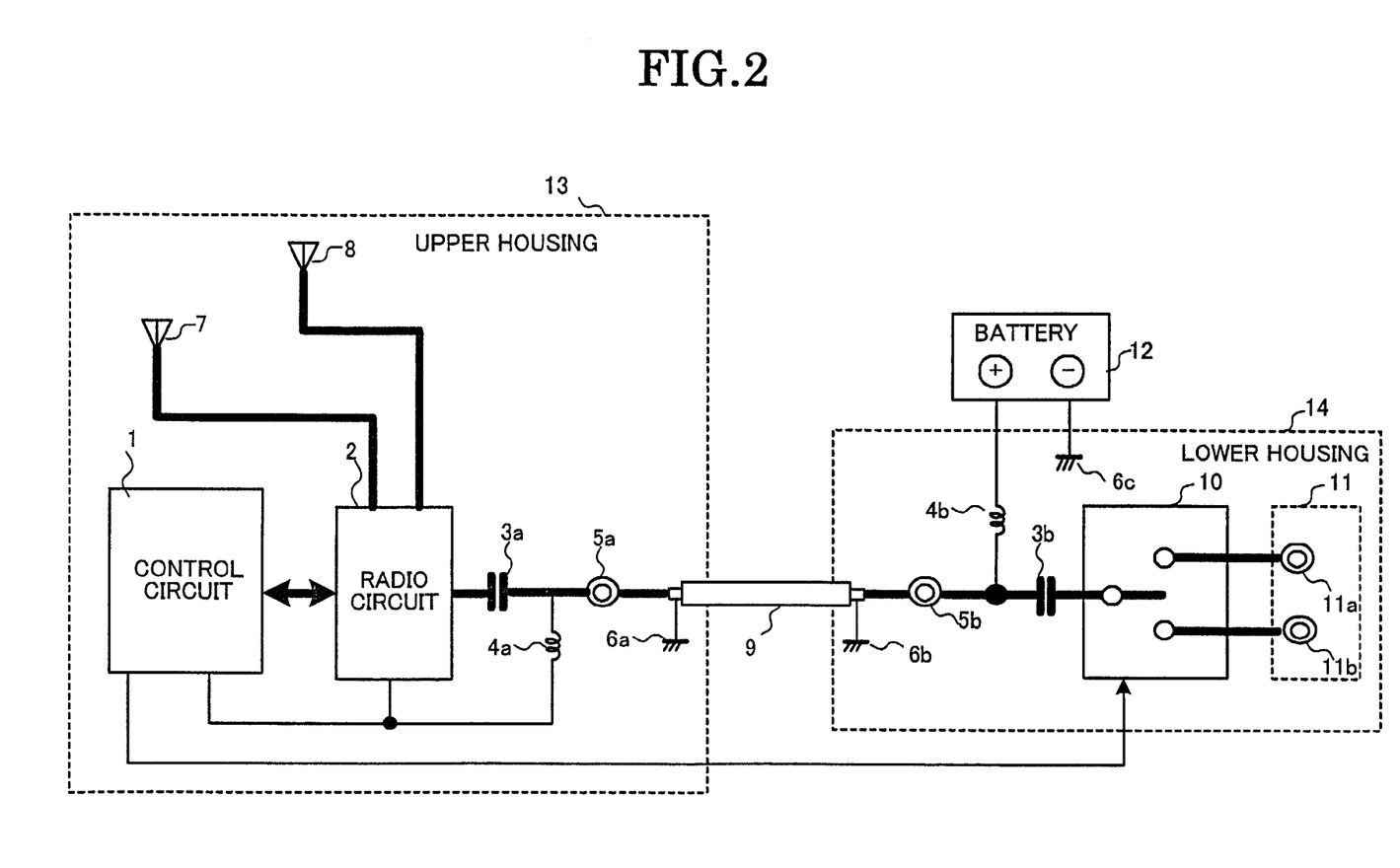
FIG. 2 is a block diagram schematically showing the internal construction of the foldable portable telephone set shown in FIG. 1.

FIG. 2 is a block diagram schematically showing the internal construction of the foldable portable telephone set shown in FIG. 1. As shown, the upper and lower housings 13 and 14 are interconnected by a cable, i.e., a coaxial cable 9 for carrying current and transmitting the radio signals. When the external antenna assembly is connected to the external input/output terminal unit 11, the coaxial cable 9 transmits the radio signals received by the external antenna assembly and supplies the power from the battery 12 to the side of the upper housing 13. In this state, the operations of antennas 7 and 8 are effectively stopped.

The upper housing 13 accommodates a radio circuit 2 for demodulating the radio signals to obtain the voice signal or image signal to output it from a loudspeaker 19 or to display it on a display 20 and also for modulating the voice signal inputted from a microphone 18 and character data or the like inputted from an input button key set 21 to obtain the radio signal, a radio signal transmitting/receiving antenna 7, an exclusive radio signal receiving antenna 8, a control circuit 1 for controlling the timings of transmitting and receiving radio signals and generating instruction signals for instructing the switching of a switch 10 to be described later, an RF (radio frequency) connector 5a for connecting the coaxial cable 9 and the lower housing 14, a GND terminal 6a provided between the RF connector 5a and the coaxial cable 9, a capacitor 3a for feeding the radio signal transmitted from the side of the lower housing 14 via the coaxial cable 9 to the radio circuit 2, and a choke coil 4a, via which the control circuit 1 and the radio circuit 2 are activated by the power supply from the battery 12.

The transmitting/receiving and exclusive receiving antennas 7 and 8 are provided in the antenna assembly 17 shown in FIG. 1. The radio circuit 2 has an amplifier for amplifying the radio signal and an isolator for preventing the mixed modulation and also for the oscillation frequency stabilization. The control circuit 1 has a detector 31 for detecting the better receiving sensitivity one of the radio signals received by the exclusive receiving and transmitting/receiving antennas in the antenna assembly 17, and a signal generator 32 for generating and supplying an instruction signal to a switch 10 to be described later for the feeding of the better receiving sensitivity radio signal as determined by the detector 31 to the radio circuit 2.

The lower housing 14 accommodates a transmitting/receiving RF terminal 11a for inputting and outputting the radio signal from and to the transmitting/receiving antenna of the external antenna assembly connected to the external input/output terminal unit 11, an exclusive receiving RF terminal 11b for inputting the radio signal received by the exclusive receiving antenna in the external antenna assembly, a switch 10 for switching the transmitting/receiving and exclusive receiving RF terminals 11a and 11b one over to the other according to an instruction signal from the control circuit 1, an RF connector 5b for connecting the coaxial cable 9 and the upper housing 13, a choke coil 4b for blocking radio signal flow to the battery 12, a capacitor 3b for inputting the radio signal mainly transmitted from the side of the upper housing 13 via the coaxial cable 9 to the switch 10, a GND terminal 6c connected to the minus terminal of the battery 12, and a GND terminal 6b provided between the RF connector 5b and the coaxial cable 9.

The operation of this embodiment of the foldable portable telephone set will now be described. Fist, the operation in radio signal communication using the antenna assembly 17 will be described. A voice signal or the like inputted to the microphone 18 is passed for noise removal through the filter and then fed to the radio circuit 2. The radio circuit 2 modulates the input voice signal or the like to a radio signal, and feeds out the radio signal at a predetermined timing instructed from the control circuit 1 to the transmitting/receiving antenna 7. The transmitting/receiving antenna 7 transmits the inputted radio signal to the opposite side base station or the like.

A radio signal transmitted from the opposite side base station or the like are received by the transmitting/receiving and exclusive receiving antennas 7 and 8. The received radio signals are fed to the radio circuit 2. The radio circuit 2 detects the better receiving sensitivity one of the radio signals received by the transmitting/receiving and exclusive receiving antennas 7 and 8, and demodulates the better receiving sensitivity radio signal to obtain the voice signal, image signal, character data, etc., for the user via the loudspeaker 19, the display 20, etc.

Now, the operation in radio signal communication using the external antenna assembly connected to the external input/output terminal unit 11 will be described. A voice signal or the like inputted from the microphone 18 or the like is passed for noise removal through the filter and then fed to the radio circuit 2. At this time, the switch 10 is in the state with its pole thrown to the side of the transmitting/receiving RF terminal 11a.

The radio circuit 2 modulates the inputted voice signal or the like to obtain a radio signal, and transmits the radio signal at a predetermined timing instructed from the control circuit 1 via the capacitor 3a, the RF connector 5a and the coaxial cable 9 to the side of the lower housing 14. On the side of the lower housing 14, the radio signal transmitted via the coaxial cable 9 is taken via the RF connector 5b to the inside. The choke coil 4b passes the more difficultly the higher the frequency is. The radio signal is thus fed out via the capacitor 3b, the switch 10 and the transmitting/receiving RF terminal unit 11a to the external antenna assembly. The transmitting/receiving antenna in the external antenna assembly transmits the inputted radio signal to the opposite side base station or the like.

The radio signal transmitted from the opposite side base station or the like is received by the transmitting/receiving and exclusive receiving antennas in the external antenna assembly. The control circuit 1 supplies a switching signal to the switch 10 at a predetermined interval for measuring or detecting the received signal level (receipt sensitivity) of the both antennas. Through the switch 10 the received signals of antennas are taken and supplied via the coaxial cable 9 to the radio circuit 2 in the upper housing 13 to convert the received signal into the IF signal. Thus obtained IF signal is supplied to the detector 31. The detector 31 detects the better receiving sensitivity one of the radio signals received by the transmitting/receiving and exclusive receiving antennas in the external antenna assembly, and feeds out the detection result to the signal generator 32.

The signal generator 32 generates an instruction signal for instructing the switching of the switch 10 according to the detection result fed out from the detector 31. The instruction signal generated in the signal generator 32 is outputted to the switch 10 to be coupled to the better receiving sensitivity antenna. For example, the instruction signal is outputted as a high level signal when the switch 10 selects the transmitting/receiving RF terminal 11a, and is outputted as a low level signal when the switch 10 selects the exclusive receiving terminal 11b.

In the case when transmitting a radio signal from the transmitting/receiving RF terminal 11a and receiving a radio signal at the exclusive receiving RF terminal 11b, the control circuit 1 may be adopted to output instruction signals to the switch 10 in synchronism to the transmission and reception timings by means of a TDMA (time division multiple access) system.

The radio signal which is received by the antenna selected by the switch 10, is transmitted via the capacitor 3b, the RF connector 5b, the coaxial cable 9, the RF connector 5a and the capacitor 3a to the radio circuit 2. The radio circuit 2 demodulates the inputted radio signal to obtain a voice signal, or the like for informing the user via the loudspeaker 19 or the like.

Now, the power supply from the battery 12 to the control circuit 1 and the radio circuit 2 will be described. Charge from the plus terminal of the battery 12 is supplied via the choke coil 4b, the RF connector 5b and the coaxial cable 9 to the side of the upper housing 13. On the side of the upper housing 13, the charge coming via the coaxial cable 9 is taken via the RF connector 5a and supplied via the choke coil 4 to the control circuit 1 and the radio circuit 2.

As shown above, in the foldable portable telephone set shown in FIG. 2 the radio signal transmission path and the power supply path are constituted by the same coaxial cable, and it is thus possible to obtain efficient inter-housing transmission of various signals in the foldable portable telephone set.

Figure 3:
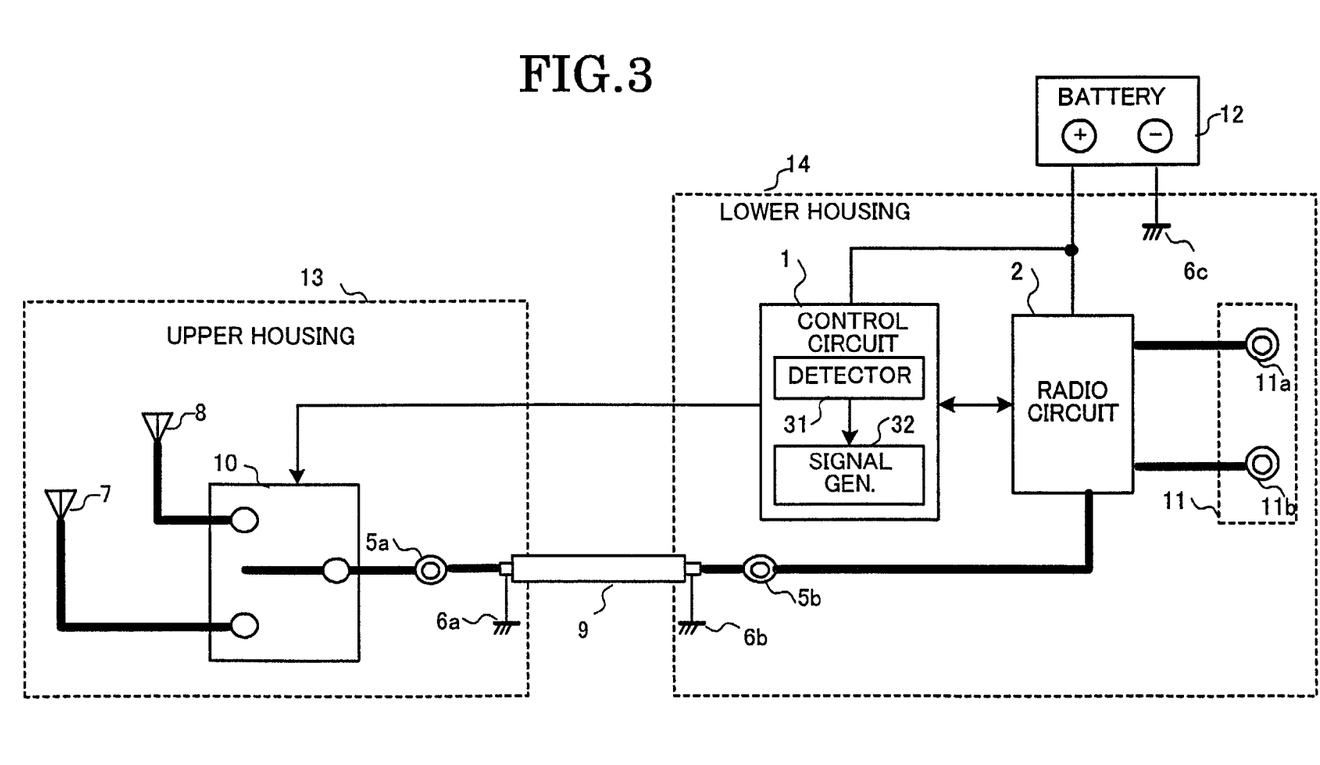
FIG. 3 is a block diagram schematically showing a foldable portable telephone set as a second embodiment of the present invention corresponding to FIG. 2.

FIG. 3 is a block diagram schematically showing a foldable portable telephone set as a second embodiment of the present invention corresponding to FIG. 2. In the illustrated foldable portable telephone set, the control circuit 1 and the radio circuit 2 are provided on the side of the lower housing 14, and the switch 10 is adapted to switch the transmitting/receiving and exclusive receiving antennas 7 and 8 according to instruction signal from the control circuit 1. In FIG. 3, parts like those in FIG. 2 are designated by like reference numerals and symbols.

The operation of this embodiment of the foldable portable telephone set will now be described. In the first place, the operation in radio signal communication using the antenna assembly 17 will be described. A voice signal or the like inputted from the microphone 18 is passed for noise removal through a filter or the like and fed to the radio circuit 2. The radio circuit 2 modulates the inputted voice signal or the like to obtain a radio signal, and transmits the radio signal at a predetermined timing instructed from the control circuit 1 via the coaxial cable 9 to the side of the upper housing 13. At this time, the switch 10 is in the state with its pole thrown to the side of the transmitting/receiving antenna 7, and the radio signal transmitted to the side of the upper housing 13 is transmitted from the transmitting/receiving antenna 7 to the opposite side base station or the like.

A radio signal transmitted from the opposite side base station or the like are received by the transmitting/receiving and exclusive receiving antennas 7 and 8. The control circuit 1 supplies a switching signal to the switch 10 at a predetermined interval for measuring or detecting the received signal level (receipt sensitivity) of the both antennas. Through the switch 10 the received signals of antennas are taken and supplied via the coaxial cable 9 to the radio circuit 2 in the lower housing 14 to convert the received signal into the IF signal. Thus obtained IF signal is supplied to the detector 31. The detector 31 detects the better receiving sensitivity one of the radio signals received by the transmitting/receiving and exclusive receiving antennas in the external antenna assembly, and feeds out the detection result to the signal generator 32.

The signal generator 32 generates an instruction signal for instructing the switching of the switch 10 according to the detection result fed out from the detector 31. The instruction signal from the signal generator 32 is outputted to the switch 10 to be coupled to the better receiving sensitivity antenna 7. For example, the instruction signal is outputted as a high level signal when the switch 10 selects the transmitting/receiving antenna, and is outputted as a low level signal when the switch 10 selects the exclusive receiving antenna 8.

The radio signal received by the antenna selected by the switch 10 is transmitted via the RF connector 45a, the coaxial cable 9 and the RF connector 5b to the radio circuit 2. The radio circuit 2 demodulates the inputted radio signal to a voice signal or the like for informing the user via the loudspeaker 19 or the like.

Now, the operation in radio signal communication using the external antenna assembly connected to the external input/output terminal unit 11 will be described. A voice signal or the like inputted from the microphone 18 for the like is passed for noise removal through the filter and fed to the radio circuit 2.

The radio circuit 2 modulates the inputted voice signal or the like to obtain a radio signal, and feeds out the radio signal at a predetermined timing instructed from the control circuit 1 via the transmitting/receiving RF terminal 11a to the transmitting/receiving antenna in the external antenna assembly. The transmitting/receiving antenna in the external antenna assembly transmits the fed-out radio signal to the opposite side base station or the like.

A radio signal transmitted from the opposite side base station or the like is received by the transmitting/receiving and exclusive transmitting antennas in the external antenna assembly. The received radio signals are fed to the radio circuit 2. The radio circuit 2 detects the better receiving sensitivity one of the radio signals received by the transmitting/receiving and exclusive receiving antennas, and demodulates the better receiving sensitivity radio signal to obtain the voice signal, image signal, character data, etc. for informing the user via the loudspeaker 19 or the display 20.

In the foldable portable telephone set shown in FIG. 3, the battery 12 is spaced apart a shorter distance from the control circuit 1 and the radio circuit 2, and less supply voltage drop takes place. It is thus possible to supply power more efficiently to the control circuit 1 and the radio circuit 2. In addition, since the upper housing can be reduced in size and weight, it is possible to reduce burden on the hinge.

Figure 4:
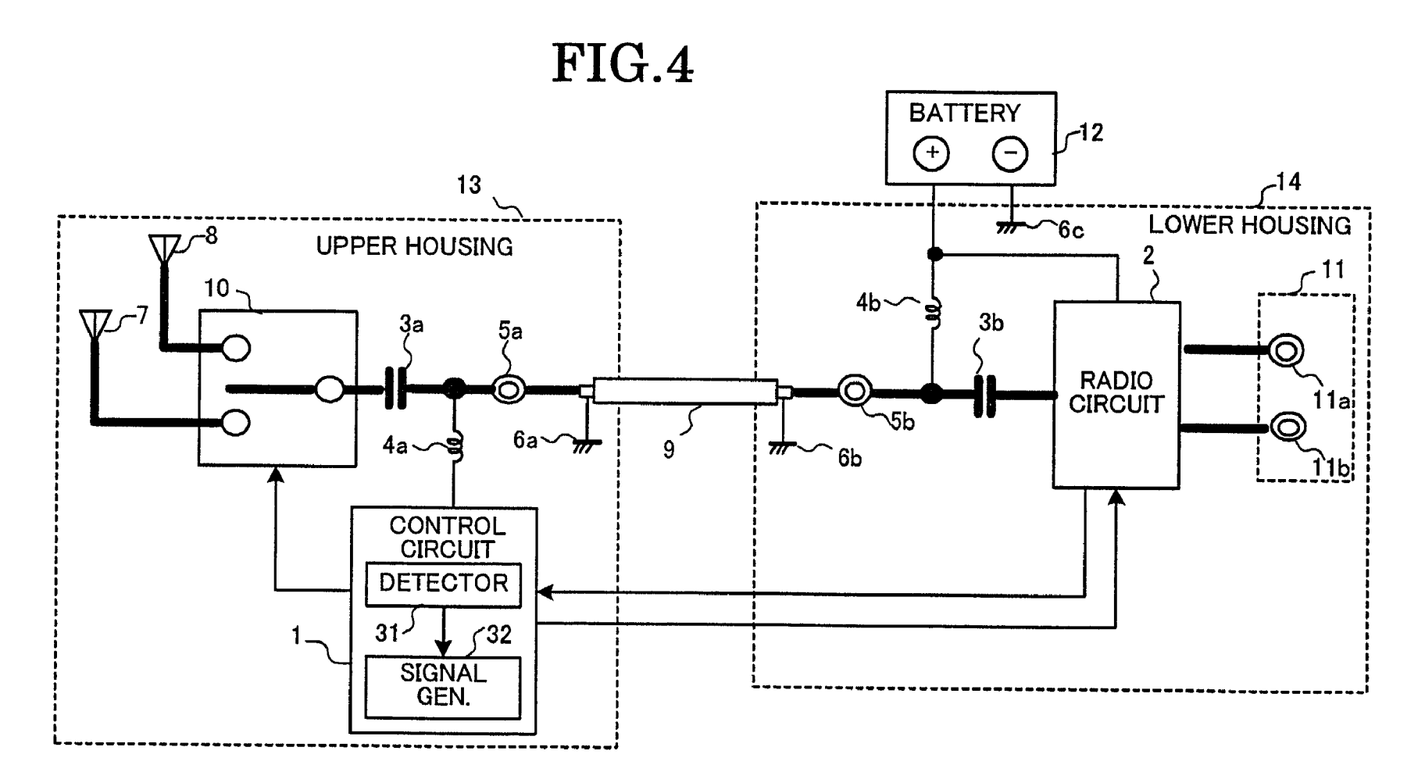
FIG. 4 is a block diagram schematically showing a foldable portable telephone set as a third embodiment of the present invention corresponding to FIG. 2.

FIG. 4 is a block diagram schematically showing a foldable portable telephone set as a third embodiment of the present invention corresponding to FIG. 2. In the illustrated foldable portable telephone set, the radio circuit 2 is provided on the side of the lower housing 14, and the switch 10 is adapted to switch the transmitting/receiving and exclusive receiving antennas 7 and 8 according to an instruction signal from the control circuit 1.

The operation of the foldable portable telephone set shown in FIG. 4 is the same as in the foldable portable telephone sets shown in FIGS. 2 and 3.

The radio circuit 2 has the amplifier and the oscillator, and these components are mostly large in size. On the other hand, the components in the control circuit 1 are mostly not so large in size. Thus, by providing the radio circuit 2 and the control circuit 1 in the lower and upper housings 14 and 13, respectively, as shown in FIG. 4, the space in each housing can be effectively used, and it is possible to reduce the size and thickness of the body of the set.

Figure 5:
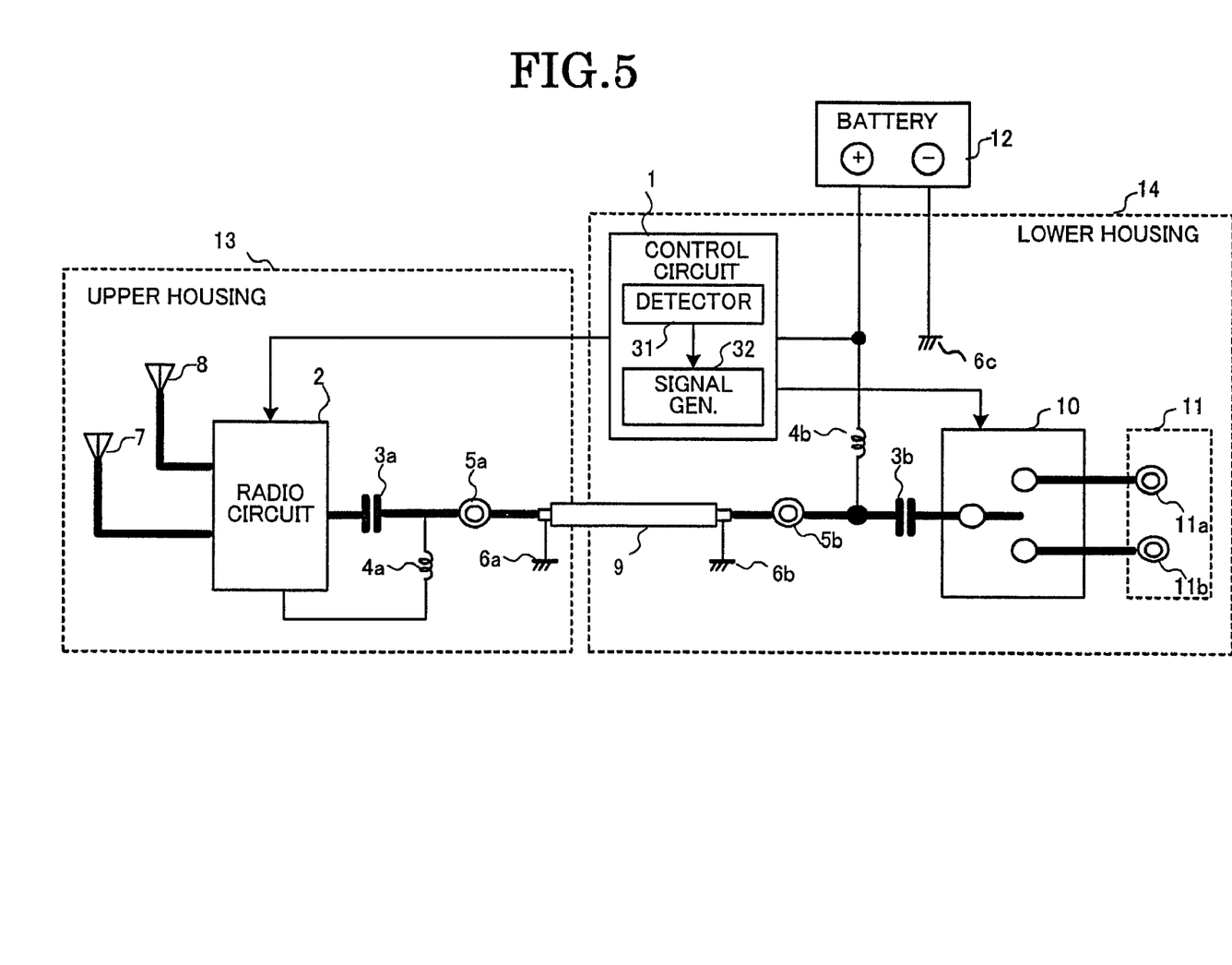
FIG. 5 is a block diagram schematically showing a foldable portable telephone set as a fourth embodiment of the present invention correspondings to FIG. 2.

FIG. 5 is a block diagram schematically showing a foldable portable telephone set as a fourth embodiment of the present invention correspondings to FIG. 2. In the illustrated foldable portable telephone set, the control circuit 1 is provided in the lower housing 14.

The operation of the foldable portable telephone set shown in FIG. 5 is the same as in the foldable portable telephone sets shown in FIGS. 2 to 4.

As described before, the control circuit 1 has many relatively large size components. In the foldable portable telephone set shown in FIG. 5, the thickness of the battery 12 can be increased compared to the one shown in FIG. 1, and it is thus possible to correspondingly increase the battery capacity.

While the above embodiments of the present invention have concerned with the foldable portable telephone sets, the present invention is also applicable to portable telephone sets, which have a plurality of built-in antenna assemblies, and also to portable telephone sets, in which the radio signal transmission path and the power supply path are separate from each other.

As has been described in the foregoing, according to the present invention the number of cables used can be reduced, and it is thus possible to reduce the size, thickness and weight of the portable telephone set. In addition, since the same cable is used to constitute the radio signal transmission path and the power supply path, it is possible to realize efficient transmission of various signals.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable telephone set comprising:
   a first housing provided with a first terminal and a second terminal to be connected with a first external antenna and a second external antenna; and
   a second housing electrically connected via a coaxial cable and mechanically connected with the first housing,
   wherein the first housing comprises:
      a switch connected via a capacitor with the coaxial cable, for selectively connecting one of the first terminal and the second terminal which provides higher receipt sensitivity on the basis of a switching signal; and
      a DC power supply connected via an inductance to the coaxial cable,
   wherein the second housing comprises:
      a radio circuit connected via a capacitance with the coaxial cable, for processing a radio signal to be transmitted, supplying the processed radio signals to at least one of a first internal antenna and a second internal antenna and processing the received radio signal;
      a control circuit connected via an inductance with the coaxial cable, for outputting the switching signal on the basis of the received signal level by the external antenna and an inductance connected between the coaxial cable and a circuit required to be supplied with the DC power supply,
   wherein the radio signal is transmitted/received and the DC power is supplied via the coaxial cable.

2. The portable telephone set according to claim 1, wherein said radio circuit demodulates the radio signal from the switch.

3. A portable telephone set comprising:
   a first housing provided with a first terminal and a second terminal to be connected with a first external antenna and a second external antenna; and
   a second housing electrically connected via a coaxial cable and mechanically connected with the first housing,
   wherein the first housing comprises:
      a switch connected via a capacitor with the coaxial cable, for selectively connecting one of the first terminal and the second terminal which provides higher receipt sensitivity on the basis of a switching signal;

a DC power supply connected via an inductance to the coaxial cable; and a control circuit for outputting the switching signal on the basis of the received signal level by the external antenna, wherein the second housing comprises:

a radio circuit connected via a capacitance with the coaxial cable, for processing a radio signal to be transmitted, supplying the processed radio signals to at least one of a first internal antenna and a second internal antenna and processing the received radio signal, and an inductance connected between the coaxial cable and a circuit required to be supplied with the DC power supply, wherein the radio signal is transmitted/received and the DC power is supplied via the coaxial cable.

4. The portable telephone set according to claim 3, wherein operations of internal antennas are stopped when the external antennas are connected, to the first terminal and the second terminal.

5. A portable telephone set comprising:

a first housing provided with a first terminal and a second terminal to be connected with a first external antenna and a second external antenna; and a second housing electrically connected via a coaxial cable and mechanically connected with the first housing, wherein the first housing comprises:

a radio circuit connected with the coaxial cable for processing a radio signal to be transmitted and supplies the processed radio signals to at least one of a first internal antenna and a second internal antenna and processing the received radio signal;

a control circuit for outputting a switching signal on the basis of the received signal level by the external antenna; and a DC power supply for supplying DC power to the radio circuit, wherein the second housing comprises:

a switch connected with the coaxial cable, for selectively connecting said at least one of the first internal antenna and the second internal antenna which provides higher receipt sensitivity, wherein the radio signal is transmitted/received via the coaxial cable.

6. The portable telephone set according to claim 5, wherein operations of internal antennas are stopped when the external antennas are connected to the first terminal and the second terminal.

7. A portable telephone set comprising:

a first housing provided with a first terminal and a second terminal to be connected with a first external antenna and a second external antenna; and a second housing electrically connected via a coaxial cable and mechanically connected with the first housing, wherein the first housing comprises:

a radio circuit connected via a capacitance with the coaxial cable for processing a radio signal to be transmitted and a radio signal received by the external antenna; and a DC power supply connected via an inductance with the coaxial cable, wherein the second housing comprises:

a switch connected via a capacitor, for selectively connecting at least one of a first internal antenna and a second internal antenna according to a switch signal; and a control circuit connected via an inductance with the coaxial cable, for outputting the switching signal on the basis of the received signal level via the coaxial cable, wherein the radio signal is transmitted/received and the DC power is supplied via the coaxial cable.

8. The portable telephone set according to claim 7, wherein operations of internal antennas are stopped when the external antennas are connected to the first terminal and the second terminal.

9. The portable telephone set according to claim 7, wherein operations of internal antennas are stopped when the external antennas are connected to the first terminal and the second terminal.

* * * * *